April 8, 1958  H. CASTAGNA ET AL  2,829,965
PROCESS OF ELIMINATING NICKEL CONTAINED IN SOLUTIONS
OF MIXED SALTS OF COBALT AND NICKEL
Filed May 15, 1956
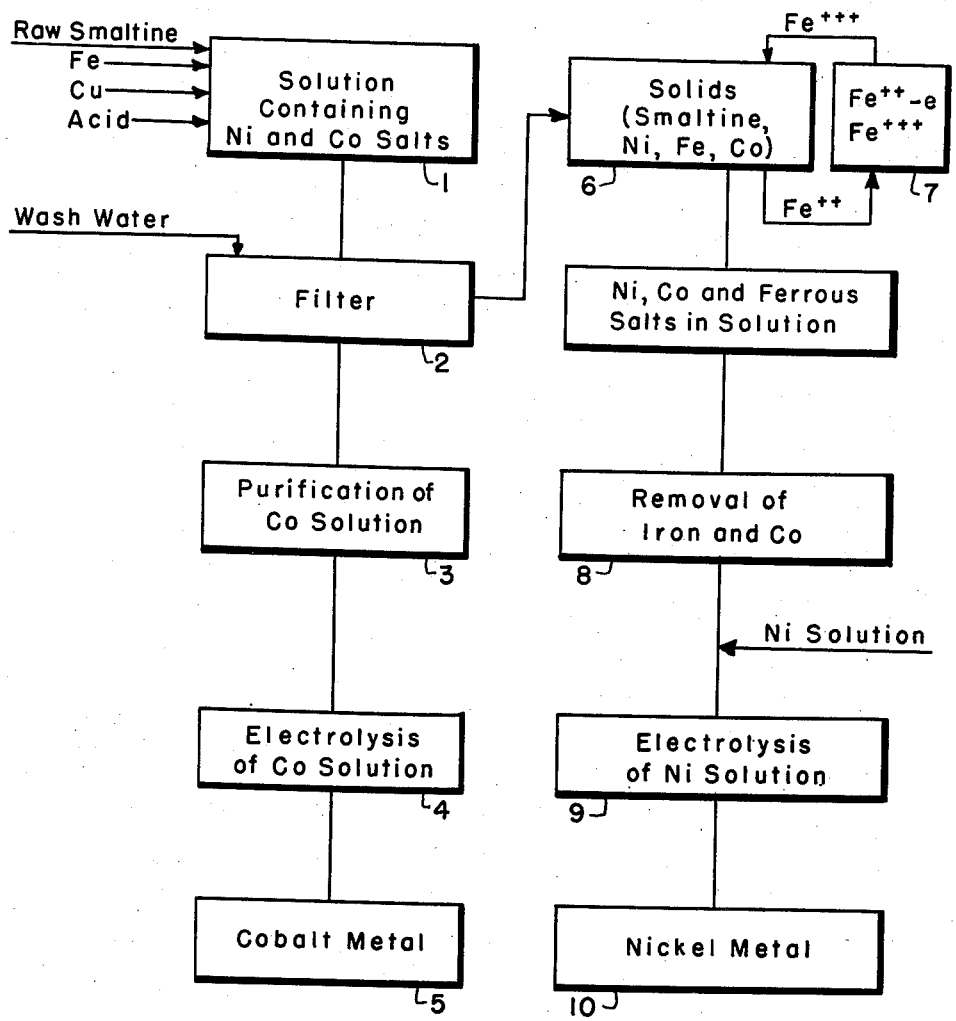
INVENTORS.
Herman Castagna
Guy Gravey
Francis Reynaud
André Roth
BY Webb, Mackey & Burden
THEIR ATTORNEYS

2,829,965

PROCESS OF ELIMINATING NICKEL CONTAINED IN SOLUTIONS OF MIXED SALTS OF COBALT AND NICKEL

Hermann Castagna, Guy Gravey, Francis Reynaud, and André Roth, Pombliere, France, assignors to Societe d'Electro-Chimie d'Electro-Metallurgie et des Acieries Electriques d'Ugine, Paris, France, a corporation of France Application May 15, 1956, Serial No. 585,080

12 Claims. (Cl. 75—109)

The present invention involves a process of eliminating the nickel contained in solutions of mixed salts of cobalt and nickel, by inner-electrolysis, which consists essentially in separating the nickel by using, jointly with a metal more electronegative than nickel, iron for example, an arsenide and/or sulpharsenide ore of cobalt and nickel more electropositive than nickel, in order to form an electrochemical couple, preferably in the presence of copper. A second step involves redissolving the separated nickel with a view to obtaining it in commercial metallic form. The electropotential scale used in this application was taken from "Electro-Chemical Data," by B. E. Conway, Elsevier Publishing Company, 1952, page 292.

The present invention is further directed to an economical process of separating nickel from cobalt and ultimately obtaining a cobalt salt solution substantially free from nickel and a nickel salt solution which is subsequently freed from the cobalt salt contained in it. These solutions may be electrolyzed to obtain the corresponding metal.

The accompanying drawing, which illustrates a preferred embodiment of our invention, is a flow sheet showing the steps of the process.

A method of carrying out the present invention is as follows:

To a mixed saline solution of sulphates or chlorides of cobalt and nickel, previously carried to a temperature above 70° centigrade and thoroughly mixed, is added raw smaltine passing through a 200 mesh screen. The raw smaltine added contains, for example: Co=10.82%, As=52.8%, Fe=8.0%, Ni=1.14%, and Au=13 g./metric ton. This smaltine has been previously subjected to an acidic treatment to eliminate therefrom any oxidized elements, which would involve an additional consumption of iron, and compounds such as raw carbonate, which would cause the pH to become unpredictable in the course of the operation. The saline solution of cobalt and nickel may be obtained from the acid attack of ores or minerals as described in application No. 579,173, filed April 19, 1956. Iron powder, preferably passing through a 100 mesh screen, is then added to the saline solution containing the raw smaltine. If the mixed solution of salts of cobalt and nickel contained no copper initially, it is added in the form of soluble salts; the total copper present after this addition represents about one-fiftieth to one-tenth by weight of the iron amount used. Acid is then rapidly added to bring the pH to a value between 1 and 4 and the solution is heated continuously from the time of the initial formation of the suspension until the pH is stabilized within these limits and almost all of the nickel contained in the starting solution has disappeared. The pH is maintained between 1 and 4, and preferably between 2 and 3, during the entire deposition of the nickel. This step is illustrated in Box 1.

The solids, which are mainly composed of smaltine, nickel and iron, are rapidly filtered after the nickel deposition is complete. They are washed, as shown in Box 2. The filtrate solution, to which the wash water is added, and which contains the greater part of the cobalt, is, after purifying if necessary as shown in Box 3, subjected to electrolysis to obtain metallic cobalt as illustrated in Boxes 4 and 5.

The second step of the process consists in solubilizing the nickel, and possibly the cobalt, deposited on the smaltine and on the residuary iron powder. The solubilization can be performed in different ways and is illustrated in Box 6 of the flow sheet. The solids obtained from the filtration step can, for example, be treated with cupric chloride or sulphate. The preferred method consists in using ferric chloride or sulphate. The ferric salts in solution must be so measured that their action is limited as much as possible to only the dissolution of the metal on the surface of the smaltine or on the residuary iron, without dissolving an appreciable amount of the smaltine. Thus, the ferric salts must be employed in proportions stoichiometrically necessary for the dissolution of only the nickel and the cobalt. The salts are introduced in these proportions initially, or in smaller proportions which must be regenerated as they are reduced following the nickel and cobalt solubilization. The regeneration is accomplished by oxidation with chlorine or oxygen from the air with a control of the oxidation potential. This is illustrated in Box 7 of the flow sheet. The action of the salts results in the recovery of the nickel, and possibly the cobalt, in the form of concentrated solution which also contains the iron converted to the state of ferrous salts. These ferrous salts are eliminated, by oxidizing them to their maximum valence and then neutralizing the solution to a pH ranging about 3 by the addition of calcium carbonate. Any arsenic, which may or may not be present, precipitates at the same time as the iron. The cobalt is then separated from the nickel, for example, by the method described in applicants' patent application Ser. No. 579,177, filed April 19, 1956. These purification processes are shown in Box 8. There is left a solution of nickel salt which is then electrolyzed to obtain metallic nickel (Boxes 9 and 10 of the flow sheet).

The raw smaltine, free from the nickel, can be recycled with other ore in the acid attack as described in applicants' patent application Ser. No. 579,173, filed April 19, 1956.

The effect of the presence or of the addition of copper into the solution to be treated is that it increases the speed of deposition of the nickel by inner-electrolysis. For example, if 500 cubic centimeters of a solution of pH equal to 3, containing 27.75 grams of cobalt and 2.63 grams of nickel, were treated by 12.5 grams of iron powder and 12.5 grams of raw smaltine for 30 minutes at 97° centigrade, 65.4% of the nickel initially present and 22% of the cobalt are separated.

If one also adds to this same solution 1.5 grams of copper in a 10% solution and performs the operation under the same conditions as above, 77% of the nickel and 25% of the cobalt are separated.

Copper can be replaced by other metals or non-metallic, conducting or semi-conducting combinations, the electrode potential of which is lower than that of the metals to be deposited.

The speed of the inner-electrolysis varies with a change in the temperature. In order that this operation be economically interesting, the temperature should not be under 70° centigrade.

The selectivity is regulated by the pH of the medium and the mode of operation. Cobalt tends to coprecipitate with nickel due to the effect of the iron powder. This coprecipitation can be limited, or even avoided, by sufficiently acidifying the solution in the beginning of the operation and by avoiding an excess amount of iron powder. The regulation of the initial pH depends upon the quantity of nickel to be eliminated. At the end of the operation, it should be preferably between 3.5 and 4.

The iron powder amount to be added is 1 to 2½ times, preferably 1.5 to 2 times, that of the nickel present and the smaltine added is 10 to 13 times the nickel present.

*Example*

500 liters of a solution of mixed chlorides of cobalt and nickel containing 26.5 kilograms of cobalt and 2.2 kilograms of nickel were brought to a temperature of 95° centigrade. The medium was thoroughly mixed. Next was added: 0.5 kilogram of copper in the form of a 10% solution of copper chloride; 25 kilograms of raw smaltine crushed to pass through a 200 mesh screen and which was previously treated by 0.5 normal hydrochloride acid to dissolve any raw carbonates and oxides which may have been on the surface of the grains; and 5 kilograms of iron powder of a size capable of passing through a 100 mesh screen.

When the suspension had become quite homogeneous, 7.5 liters of 22° Bé. hydrochloric acid diluted with the same quantity of water were added rapidly but in a regular manner to bring the pH to 3.5 and to maintain it there during the deposition of the nickel.

The temperature was maintained at about 95° up to the end of the operation, which lasted about one hour. The products of the separation were then filtered and washed with 50 liters of cool water until only traces of cobalt were left in the wash water. The filtrate and wash water were joined, which resulted in 500 liters of a solution, containing 0.031 gram of nickel per liter and 52 grams of cobalt per liter.

Thus, there were 26 kilograms of cobalt and 0.0155 kilogram of nickel left in the solution. 99.3% of the nickel initially present had been extracted and had carried along 1.8% of the cobalt. The nickel content of the solution, in relation to the cobalt was of 0.06 part of nickel for 100 parts of cobalt.

The smaltine and the residuary iron powder containing the nickel were then treated, in a second step of the operation, by successive washings by means of 50 liters of a solution of ferric chloride containing 2% iron. The solution was, after each passage, reoxidized by chlorine, by controlling the oxidation potential, and recycled again on the smaltine. The leaching was stopped when practically no more nickel was dissolved. This solution was then filtered and the solids were washed.

The filtrate, joined with the wash water, had a volume of 52 liters and contained 42 grams of nickel per liter and 12 grams of cobalt per liter.

Thus, 2.184 kilograms of nickel were recovered out of 2.200 kilograms employed, that is, a yield of extraction of 99.3%.

The smaltine, free from the nickel was again washed with water and recycled with roasted ore for the acidic attack of the ore in preparation of a new solution containing the mixed salts of cobalt and nickel.

The invention is not limited to the preferred embodiment but might be otherwise embodied or practiced within the scope of the following claims.

We claim:

1. A process of separating nickel from cobalt contained in a mixed solution of the salts of cobalt and nickel by inner electrolysis, which comprises adding to said solution a solid metal more electronegative than nickel, a solid material from the group consisting of sulpharsenide and arsenide ore of cobalt and nickel, more electropositive than nickel, and an acid; maintaining the mixture at a temperature above 70° C. and at a pH of about 1 to 4.0 to deposit the nickel on the solid metal and material, separating the solids containing the nickel and a little cobalt from the solution containing substantially only cobalt, treating the solids containing nickel and cobalt to dissolve the nickel and cobalt and recover the nickel.

2. A process according to claim 1 wherein the metal added, which is more electronegative than nickel, is iron.

3. A process according to claim 1 wherein the arsenide ore is smaltine.

4. A process according to claim 1 wherein the material from the group consisting of sulpharsenide and arsenide ore is added in an amount ranging about 10 to 13 times the amount of nickel present.

5. A process according to claim 1 wherein the metal added is in an amount ranging about 1 to 2½ times the amount of nickel present.

6. A process according to claim 1 wherein copper is added to the solution.

7. A process according to claim 1 wherein copper is present in the solution in an amount ranging about $\frac{1}{50}$ to $\frac{1}{10}$ by weight of the amount of said more electronegative metal added to the solution.

8. A process according to claim 1 wherein iron and smaltine are the metal and ore, respectively, added to the solution.

9. A process according to claim 1 wherein iron, smaltine, and copper are added to the solution.

10. A process according to claim 1 wherein iron is added to the solution in an amount ranging about 1 to 2½ times the amount of nickel present, and smaltine is added to the solution in an amount ranging about 10 to 13 times the amount of nickel present.

11. A process according to claim 1 wherein the solids are leached with a cupric salt solution to dissolve the nickel.

12. A process according to claim 1 wherein the solids are treated with a ferric salt solution to dissolve the nickel.

References Cited in the file of this patent

UNITED STATES PATENTS

| | | |
|---|---|---|
| 1,592,306 | Lienhardt | July 13, 1926 |
| 2,509,918 | Griffith et al. | May 30, 1950 |
| 2,651,562 | De Merre | Sept. 8, 1953 |
| 2,671,712 | De Merre | Mar. 9, 1954 |

UNITED STATES PATENT OFFICE
CERTIFICATE OF CORRECTION

Patent No. 2,829,965                                                          April 8, 1958

Hermann Castagna et al.

It is hereby certified that error appears in the above numbered patent requiring correction and that the said Letters Patent should read as corrected below.

In the heading to the printed specification, between lines 10 and 11, insert the following:

-- Claims priority, application France May 23, 1955 --.

Signed and sealed this 5th day of August 1958.

(SEAL)
Attest:
KARL H. AXLINE
Attesting Officer

ROBERT C. WATSON
                                                                                    Commissioner of Patents